United States Patent
Liberfarb

(10) Patent No.: US 7,063,100 B2
(45) Date of Patent: Jun. 20, 2006

(54) FLOW REGULATOR WITH PRESSURE RELIEF COMBINATION VALVE

(75) Inventor: Zilek Liberfarb, Morton Grove, IL (US)

(73) Assignee: HydraForce Inc., Lincolnshire, IL (US)

( * ) Notice: Subject to any disclaimer, the term of this patent is extended or adjusted under 35 U.S.C. 154(b) by 268 days.

(21) Appl. No.: 10/794,374

(22) Filed: Mar. 4, 2004

(65) Prior Publication Data

US 2004/0206397 A1    Oct. 21, 2004

Related U.S. Application Data

(60) Provisional application No. 60/452,432, filed on Mar. 6, 2003.

(51) Int. Cl.
*G05D 11/03* (2006.01)
*F16K 11/00* (2006.01)

(52) U.S. Cl. ............. 137/115.08; 137/101; 137/115.03; 137/115.05; 137/454.5

(58) Field of Classification Search ............. 137/101, 137/115.03, 115.04, 115.05, 115.08, 454.5
See application file for complete search history.

(56) References Cited

U.S. PATENT DOCUMENTS

| 3,160,167 | A | * | 12/1964 | Martin | 137/101 |
| 3,915,186 | A | * | 10/1975 | Thomas | 137/115.06 |
| 4,361,166 | A | * | 11/1982 | Honaga et al. | 137/115.07 |
| 6,966,329 | B1 | * | 11/2005 | Liberfarb | 137/115.05 |

* cited by examiner

*Primary Examiner*—Stephen M. Hepperle
(74) *Attorney, Agent, or Firm*—Leydig, Voit & Mayer

(57) ABSTRACT

A flow regulator with pressure relief combination valve is disclosed which can include a housing and a valve assembly. The housing can have a chamber and four ports. A cage, having a plurality of cross holes, is supported by the housing. A hollow spool is slidably disposed within the cage and is biased to engage the cage. A shoulder of the cage and a counterbore of the spool cooperate to interferingly retain an insert. A poppet is slidably disposed inside of the cage. The valve assembly includes an adaptor, a spring disposed within the adaptor, a guide disposed between the spring and the poppet, and an adjuster adjustably secured to the adaptor. The spring is arranged to bias the poppet against a seat via the guide. The adjustor is movable to adjust the position of the spring.

17 Claims, 2 Drawing Sheets

FLOW REGULATOR WITH PRESSURE RELIEF COMBINATION VALVE

CROSS-REFERENCE TO RELATED PATENT APPLICATIONS

This patent application claims the benefit of priority to U.S. Provisional Patent Application No. 60/452,432, filed Mar. 6, 2003, and entitled "Flow Regulator With Pressure Relief Combination Valve," which is incorporated in its entirety herein by this reference.

FIELD OF THE INVENTION

The present invention relates generally to hydraulic valves and, more particularly, to flow regulators.

BACKGROUND OF THE INVENTION

A priority-type flow regulator typically has an inlet port, a priority flow port, and a bypass flow port. A priority-type flow regulator can be used to provide a desired priority flow rate regardless of load pressure changes in the priority and bypass lines or of variations in the inlet flow rate.

A combination of a priority flow regulator with a pressure relief valve can be used to provide an additional function—pressure relief of priority flow. In the known priority-flow-with-pressure-relief combination valve arrangements, the pressure relief outlet is connected to the bypass line inside of the valve. In this case, pressure in the bypass line used for auxiliary functions interacts with the pressure in the priority line which can substantially restrict the available pressure level in each of the lines.

Also priority flow regulators and pressure relief valves often are susceptible to instability accompanied by vibration and noise, especially if they are used next to each other. This is so because each of these valves is actually an oscillating system that requires appropriate dampening for stable operation.

SUMMARY OF THE INVENTION

The present invention provides a priority flow regulator with pressure relief combination valve that has a four-port configuration with the fourth port useful for providing a connection from a relief valve to a tank. This arrangement allows for using the bypass line for an auxiliary function at any pressure level independent of the position of the priority pressure relief valve. Preferably, the combination valve comprises a cartridge-type priority flow regulator.

The combination valve provides a cost-effective, high-performance priority flow control with built-in pressure relief valve. Advantageously, the combination valve can provide stable and substantially noiseless operation at all load conditions.

The features of the present invention will become apparent to one of ordinary skill in the art upon reading the detailed description, in conjunction with the accompanying drawings, provided herein.

DETAILED DESCRIPTION OF EMBODIMENTS OF THE INVENTION

Figure 1:
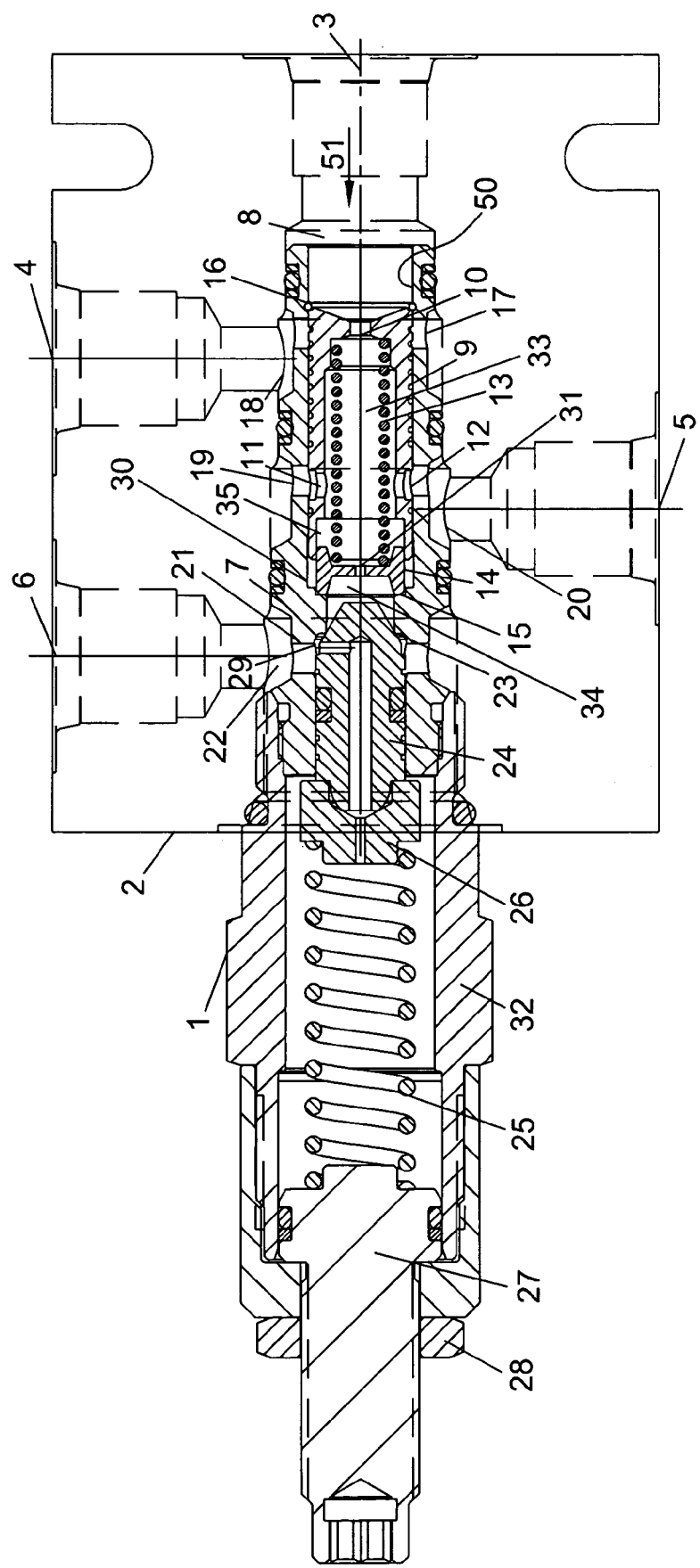
FIG. 1 is an elevational section view of an embodiment of a valve according to the present invention.

In accordance with the teachings of the present invention, there is provided a priority flow regulator with pressure relief combination valve. Referring to FIG. 1, in one of the embodiments, the inventive valve comprises a valve assembly 1 supported by a housing 2. The housing has an input port 3 which can be connected to a source of pressurized fluid, a bypass port 4 which can be connected to a tank or used as a source of pressurized fluid supply for auxiliary functions, a priority flow port 5, and a return flow port 6 which can be connected to a tank.

The valve assembly 1 includes a hollow cage 7 that cooperate with a cavity 8 formed in the housing to define a plurality of internal chambers. A hollow spool 9, which includes a metering orifice 10 and a plurality of cross-holes 11 which open to a groove 12, is slidably arranged within the cage 7 on a side facing the inlet port 3. A spring 13, disposed within the spool 9, is supported on one side by an insert 14 abutted to a shoulder 15 of the cage 7. The spring 13 urges the spool 9 in a direction away from the insert 14 toward the inlet port 3 such that the spool 9 is biased to engage a stop defined by a retaining ring 16 arranged inside of the cage 7.

The cage 7 has a plurality of plural cross-holes arranged in rows. A first row 17 of cross-holes is open to a first housing chamber 18 connected to the bypass flow port 4. A second row 19 of cross-holes is open to a second housing chamber 20 connected to the priority flow port 5. A third row 21 of cross-holes is open to a third housing chamber 22 connected to tank port 6.

A seat 23 is disposed in the cage shoulder 15 on the side opposite to the insert 14. A poppet 24, slidably disposed inside of the cage 7, is urged against the seat 23 by a spring 25 via the guide 26. The spring force can be adjusted with an adjuster 27 that can be locked in a range of positions with a lock nut 28 which is threadedly engaged to the adjuster 27.

The insert 14 is slidably disposed within a counterbore 35 of the spool 9. The insert 14 is configured such that the counterbore 35 of the spool 9 and the cage shoulder 15 interferingly captures it. The insert 14 can act to provide a dampening chamber 30 within the cage 7 between the cage shoulder 15, the insert 14, and the spool 9. The insert 14 defines an orifice 31 of a restricted area.

A priority type pressure compensating flow regulator assembly can comprise the part of the cage 7 between the shoulder 15 and the end 50 of the cage on the side of inlet port 3 together with the components disposed within that part of the cage—the spool 9, the spring 13, the insert 14, and the retaining ring 16. A relief valve assembly can comprise the remaining part of the cage together with the seat 23, a poppet 24, a spring 25, a guide 26, an adjuster 27, and an adaptor 32. A priority type flow regulator with a pressure relief combination valve can comprise the cage 7 threaded into the adaptor 32 together with all other parts mentioned above disposed therein.

In the absence of a flow supply to the inlet port 3, the spool 9 abuts the retaining ring 16, and the poppet 24 rests on the seat 23. In this initial position, the bypass and return flow ports 4, 6 are disconnected from the other ports and from each other. The inlet port 3 is connected to the priority flow port 5 via a priority flow path through the cavity 8, the orifice 10, a cavity 33 defined by the interior of the spool 9, the cross-holes 11, the groove 12, the second row 19 of cross-holes, and the second housing chamber 20.

The spool 9 remains in the initial position providing the above-described flow path while the flow supply rate at the inlet port 3 is lower than a predetermined priority flow rate. Once the flow supply rate exceeds the priority flow level, a pressure drop across the orifice 10 creates a force applied to the spool 9 that exceeds the pre-load force of the spring 13 which causes the spool 9 to move in response in a direction 51 away from the inlet port 3. This movement of the spool 9 establishes a connection, via a bypass flow path, between the inlet port 3 and the bypass port 4 through the cavity 8, the first row 17 of cross-holes, and the first housing chamber 18. The connection via the priority flow path between the inlet port 3 and the priority flow port 5 remains open to provide a pre-determined priority flow rate to the priority flow port 5, while excessive flow is directed from the inlet port 3 to the bypass port 4.

The cavity 33 inside of the spool 9 is connected to a cavity 34 disposed between insert 14 and the poppet 24. The poppet 24 remains engaged with the seat 23 until the pressure at the priority port 5 reaches a predetermined pressure level, which is selectively set by the adjuster 27. Once the pressure at the priority port 5 exceeds the predetermined level, the poppet 24 moves in response thereto and establishes a connection between the cavity 34 and a cavity 29 as part of a return flow path between the input port 3 and the tank port 6. From this moment, a part, or all, of the priority flow will go to the tank port 6 through the cavity 33, the orifice 31, the cavities 34, 29, the third row 21 of cross-holes, and the third housing chamber 22.

The bypass flow port 4 can be connected to a tank or be used for auxiliary functions. In the latter case, the load of the auxiliary function defines the pressure level at the bypass port 4 independent of the pressure level at the port, though, in this embodiment of the invention, the maximum pressure at the port 4 preferably does not exceed the priority pressure relief set.

The dampening chamber 30 is connected with the chamber 33 through the restrictive clearance between the internal diameter of the spool 9 and the outside diameter of the insert 14. In a steady-state position of the spool 9, pressure in both chambers 30, 33 is equalized. In a transient mode, the spool 9 can change its position with the dampening chamber 30 slowing down abrupt spool movement to reduce spool oscillations and provide stable valve operation.

The restricted area of the orifice 31 of the insert 4 substantially improves the stability of the pressure relief valve by reducing pressure spikes at the opening and the closing of the valve.

Figure 2:
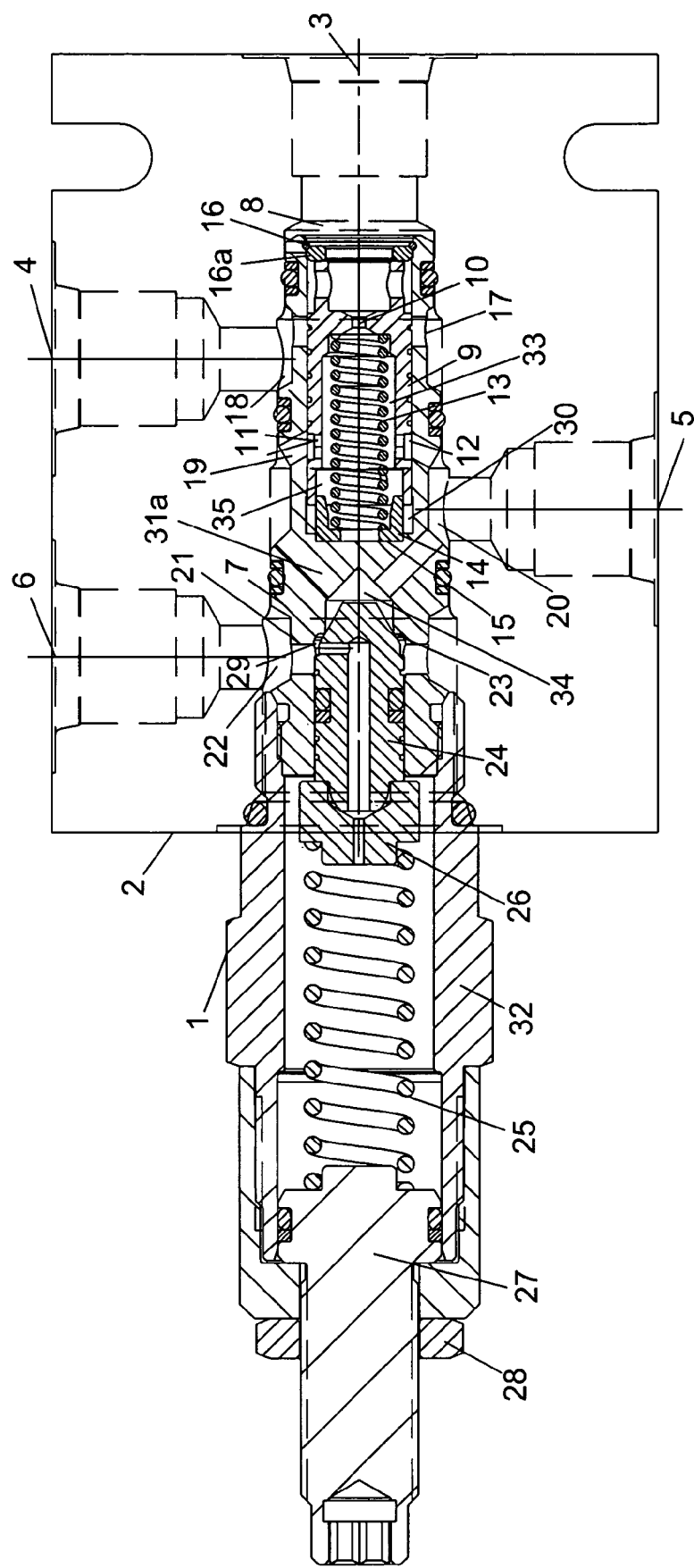
FIG. 2 is an elevational section view of another embodiment of a valve according to the present invention.

Referring to FIG. 2, another embodiment of a valve according to the present invention is shown. The chamber 34 is connected to the priority port 5 by at least one channel 31a and the second housing chamber 20, rather than being connected to the chamber 33 of the spool 9 through the orifice 31 like in the embodiment of a valve shown in FIG. 1. The arrangement of FIG. 2 can allow the pressure level at the bypass port 4 to be not only independent of the pressure at the priority port 5 but also reach and exceed the priority pressure defined by the relief valve without interrupting the priority flow. In the valve shown in FIG. 2, the retaining ring 16 and a washer 16a define the stop restricting the displacement of the spool 9. The valve shown in FIG. 2 can be similar to the valve shown in FIG. 1 in other respects.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

What is claimed is:

1. A valve comprising:
   a housing, the housing having a chamber and an input port, a priority flow port, a return flow port, and a bypass port, the ports communicating with the chamber;
   a cage supported by the housing, the cage having a plurality of cross holes, the cage having an open end connected to the input port, the cage having a stop and a shoulder;
   a hollow spool slidably disposed within the cage, the spool having a counterbore, the spool biased to engage the cage;
   an insert disposed within the cage adjacent the shoulder of the cage, the insert disposed within the counterbore of the spool, the shoulder of the cage and the counterbore of the spool cooperating to interferingly retain the insert and to define a dampening chamber; and
   a relief valve assembly, the valve assembly including a seat disposed adjacent the shoulder of the cage opposite to the insert, a poppet slidably disposed inside of the cage, an adaptor mounted to the cage, a spring disposed within the adaptor, a guide disposed between the spring and the poppet, and an adjuster adjustably secured to the adaptor, the spring arranged to bias the poppet against the seat via the guide, the adjustor operable to adjust the position of the spring.

2. The valve according to claim 1 wherein the valve comprises a cartridge-type priority flow regulator.

3. The valve according to claim 2 wherein the valve comprises a pressure compensating flow regulator.

4. The valve according to claim 3 wherein the valve comprises a cartridge-type priority flow regulator.

5. The valve according to claim 1 wherein the stop of the cage is defined by a retaining ring.

6. The valve according to claim 1 wherein the stop of the cage is defined by a retaining ring and a washer.

7. The valve according to claim 1 wherein the spool includes a metering orifice.

8. The valve according to claim 1 further comprising a spring disposed within the spool, a first end of the spring engaging the insert and a second end of the spring engaging the spool, the spring biasing the spool in a direction away from the insert toward the inlet port.

9. A cartridge type priority flow regulator comprising:
a housing, the housing having a chamber and an input port communicating with the chamber;
a cage having a plurality of cross holes, the cage having an open end connected to the input port, the cage having a stop and a shoulder;
a hollow spool slidably disposed within the cage, the spool having a counterbore, the spool biased to engage the cage; and
an insert disposed within the cage adjacent the shoulder of the cage, the insert disposed within the counterbore of the spool, the shoulder of the cage and the counterbore of the spool cooperating to interferingly retain the insert and to define a dampening chamber.

10. The valve according to claim 9 wherein the spool is biased to engage the cage by a spring disposed within the spool, a first end of the spring engaging the insert and a second end of the spring engaging the spool, the spring biasing the spool in a direction away from the insert toward the inlet port.

11. The valve according to claim 9 further comprising:
a relief valve assembly.

12. The valve according to claim 11 wherein the relief valve assembly comprises a seat disposed adjacent the shoulder of the cage in opposing relationship to the insert, a poppet slidably disposed in the cage, a spring for urging the poppet against the seat, and an adjuster in operable relationship with the spring for selectively varying the spring force applied thereby.

13. A valve comprising:
a housing, the housing having a chamber and an input port, a priority flow port, and a bypass port, the ports communicating with the chamber;
a cage supported by the housing, the cage having a plurality of cross holes, the cage having an open end connected to the input port, the cage having a stop and a shoulder;
a hollow spool slidably disposed within the cage;
an insert disposed within the cage adjacent the shoulder of the cage, the insert disposed adjacent the spool, the cage and the spool cooperating to interferingly retain the insert and to define a dampening chamber;
a spring disposed within the spool, the spring biasing the spool to engage the stop of the cage;
wherein the input port and the priority flow port are in fluid connection with each other via a priority flow path through the cage and the spool, and wherein when a flow supply rate of a fluid at the inlet port exceeds a predetermined level, the spool moves in response thereto away from the stop of the cage to establish a bypass flow path between the input port and the bypass port, such that a predetermined priority flow rate is substantially maintained in the priority flow path and any excess flow is directed along the bypass flow path.

14. The valve according to claim 13 further comprising:
a relief valve assembly for substantially maintaining the pressure at the input port at or below a predetermined level.

15. The valve according to claim 14 wherein the housing includes a return flow port, the return flow port in communication with the chamber of the housing, the relief valve assembly comprises a seat disposed adjacent the cage, a poppet slidably disposed in the cage, a spring for urging the poppet against the seat, and an adjuster in operable relationship with the spring for selectively varying the spring force applied thereby, wherein when the pressure at the priority port exceeds the predetermined level, the poppet moves in response thereto, thereby establishing a return flow path connection between the input port and the return flow port.

16. The valve according to claim 13 wherein the cage is configured such that the pressure level at the bypass port is independent of the pressure level at the priority port.

17. The valve according to claim 15 wherein the cage is configured such that the pressure level at the bypass port is independent of the pressure level at the priority port, and the pressure level at the bypass port can exceed the predetermined level.

* * * * *